US006538851B1

(12) United States Patent
Sasaki

(10) Patent No.: US 6,538,851 B1
(45) Date of Patent: Mar. 25, 2003

(54) MAGNETIC DISK APPARATUS

(75) Inventor: Yasutaka Sasaki, Tachikawa (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/501,378

(22) Filed: Feb. 9, 2000

(30) Foreign Application Priority Data

Jun. 29, 1999 (JP) .......................................... 11-183219

(51) Int. Cl.$^7$ .............................. G11B 5/54; G11B 21/22
(52) U.S. Cl. .................................. 360/254.8; 360/255
(58) Field of Search .......................... 360/254.7, 254.8, 360/254.9, 255, 254.2, 254.3, 254.4, 250, 254

(56) References Cited

U.S. PATENT DOCUMENTS 5,864,448 A  1/1999 Berberich ................... 360/105

FOREIGN PATENT DOCUMENTS

JP          8-297938          11/1996

*Primary Examiner*—David L. Ometz
(74) *Attorney, Agent, or Firm*—Gray Cary Ware & Freidenrich LLP

(57) ABSTRACT

The magnetic disk device is equipped with a ramp loading mechanism supporting magnetic heads at positions away from magnetic disks via suspensions, when a head actuator is moved to the retreated position. The ramp loading mechanism includes a ramp provided outside the magnetic disks, and tabs provided at the ends of the suspensions. Contact portions of the tabs extending from two suspensions located between two adjacent magnetic disks are situated such that the their positions in the up-and-down relationship are switched, and accordingly the positions of corresponding guide surfaces of the ramp are switched. These contact portions are arranged on the center axis of the corresponding suspension.

7 Claims, 10 Drawing Sheets

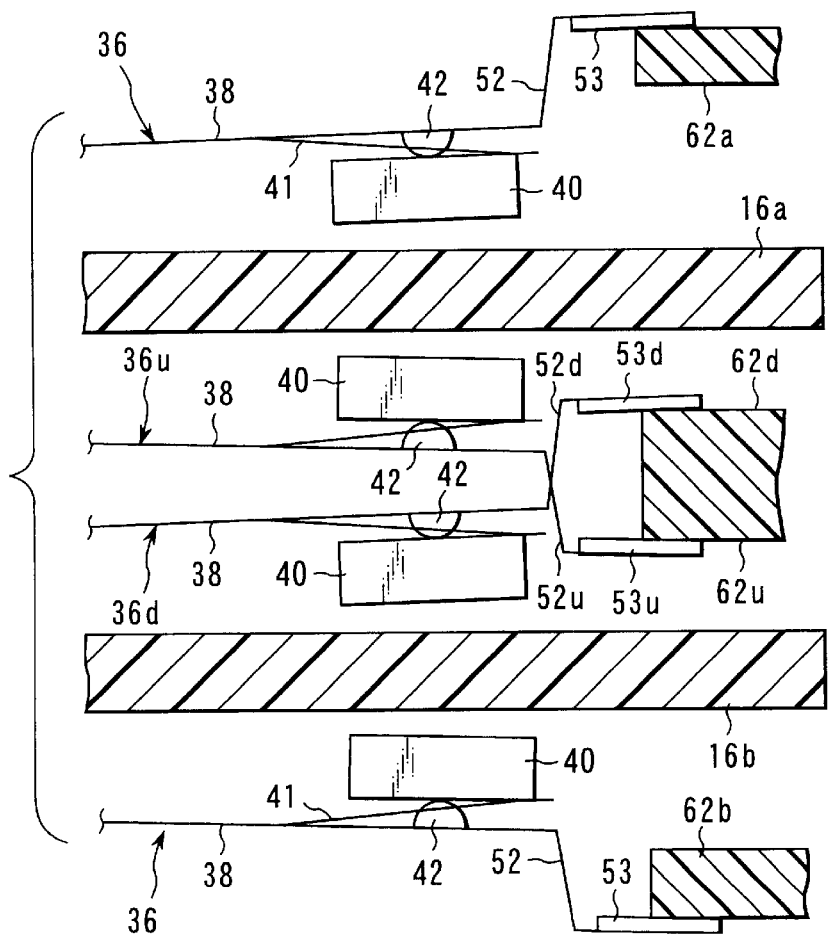
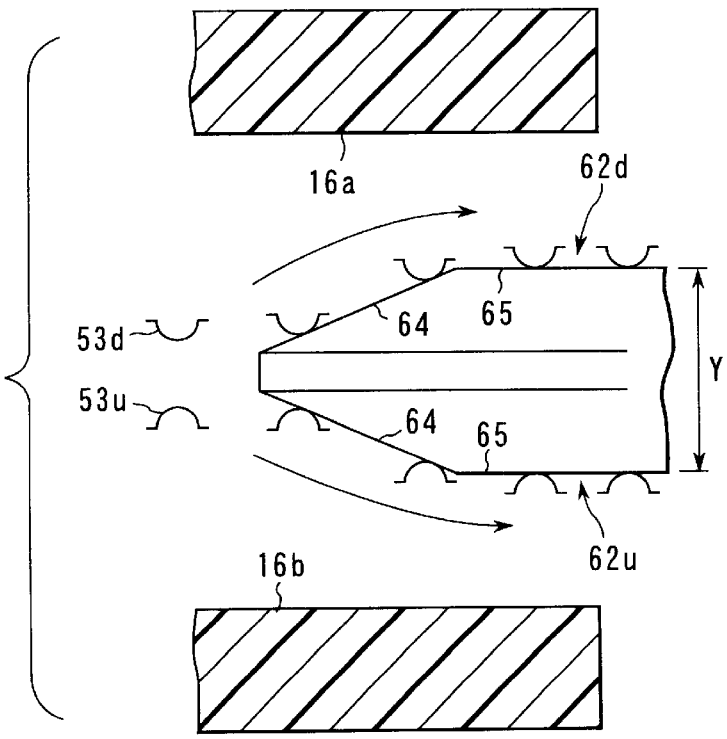

MAGNETIC DISK APPARATUS

CROSS-REFERENCE TO RELATED APPLICATIONS

This application is based upon and claims the benefit of priority from the prior Japanese Patent Applications No. 11-183219, filed Jun. 29, 1999; the entire contents of which are incorporated herein by reference

BACKGROUND OF THE INVENTION

The present invention relates to a magnetic disk apparatus, and more specifically to a magnetic disk apparatus equipped with a ramp loading mechanism.

In recent years, in the field of the electronic device such as a personal computer, a magnetic disk apparatus is widely used as a large-capacity memory device. In general, a magnetic disk apparatus comprises a magnetic disk arranged in a case, a spindle motor for supporting and rotating the magnetic disk, a head actuator for supporting magnetic heads, a voice coil motor for driving the head actuator, a substrate unit and the like.

The head actuator includes a bearing section set on the bottom of the case, a plurality of arms extending from the bearing section, and suspensions extending from the respective arms, and the magnetic heads are mounted on extending ends of the suspensions.

With regard to the magnetic disk apparatus described as above, there are two types of methods for holding the magnetic heads at a predetermined position while the apparatus is not in operation, that is, a so-called CSS (contact-start-stop) method for holding the magnetic heads on an inner circumference of the magnetic disk, and a ramp loading method for holding the magnetic heads apart from the surfaces of the magnetic disk by a ramp provided on the outside of the magnetic disk.

Meanwhile, in recent years, portable small-size personal computers are becoming popular, and there is a demand of improving the reliability of a magnetic disk device mounted in a personal computer of this type, against shocks and the like while being carried. Under these circumstances, in such magnetic disk devices, the application of a ramp loading method which can retain the magnetic heads more accurately is promoted.

In general, the ramp loading mechanism comprises a tab extending from the tip end of each suspension, and a ramp provided on the outside of the magnetic disk. When the magnetic disk device is not in operation, the head actuator is turned to the outer circumference of the magnetic disk, and the tab of each suspension move up the ramp. In this manner, the magnetic heads are held at a position away from the surfaces of the magnetic disk, thus preventing the collision of the heads against the magnetic disk, which might occur when the apparatus undergoes a mechanical shock.

In general, the ramp of a ramp loading mechanism is arranged such that a portion of the ramp overlaps with the outer circumferential portion of the magnetic disk. With this structure, that portion of the ramp which is situated between two adjacent magnetic disks, has an upper-side guide surface and a lower-side guide surface for guiding two magnetic heads, one on the upper side and the other on the lower side, respectively. These upper-side guide surface and lower-side guide surface are situated between magnetic disks in such a manner that these surfaces oppose to each other at a predetermined distance.

In order to unload the magnetic heads to a retreated position on the ramp, it is necessary to place the end of each guide surface of the ramp closer to the magnetic disk surface side than the corresponding tab of the suspension. Therefore, a gap between each end of the ramp and the surface of the magnetic disk is made very narrow.

With this structure, when assembling the magnetic disk apparatus, there is a high possibility of danger that a magnetic disk is brought into contact with the ramp, which may result in damaging the surface of the disk. Further, even after the assembly, there is a high possibility that the magnetic disk is brought into contact with the ramp when the apparatus undergoes a mechanical shock by some external force. Such possibilities are further raised as the number of magnetic disk mounted in the magnetic disk apparatus is increased.

Therefore, the distance between the ramp and the surface of a magnetic disk should preferably be made as wide as possible. However, as the density of the apparatus assembled is increased, the thickness of the magnetic head is decreased, or the distance between loaded disks is decreased, and therefore the distance between the surface of a magnetic disk and the ramp is shortened further. At the same time, there is an increasingly great demand of preventing damages to disks while assembling the apparatus, and improving the reliability of the apparatus against shocks. Under these circumstances, essential countermeasures are needed.

BRIEF SUMMARY OF THE INVENTION

The present invention has been contrived in consideration of the above circumstances, and its object is to provide a reliability-improved magnetic disk apparatus in which the gap between a ramp and a surface of a magnetic disk is expanded without deteriorating its high-density mounting degree, so as to avoid contact between the ramp and the magnetic disk while assembling the apparatus or effected by some shock.

In order to achieve the above-described object, there is provided, according to the present invention, a magnetic disk device comprising: a plurality of magnetic disk provided at predetermined intervals; drive means for supporting and rotating the magnetic disks; a head actuator having a plurality of magnetic heads for recording/reproducing data on/from the magnetic disks, and a plurality of suspensions supporting the respective magnetic heads, for supporting the magnetic heads to be movable with respect to the magnetic disks; and a ramp loading mechanism for holding each of the magnetic heads at a position distant from the respective magnetic disk when the magnetic heads are moved to an outer circumference of the magnetic disks.

The ramp loading mechanism includes a ramp having a plurality of guides provided near the outer circumference of the magnetic disks and arranged at intervals between each other in an axial direction of the magnetic disks, and engagement members each provided at an end of the respective suspension, which is engaged with a guide of the ramp when the respective magnetic head is moved to the outer circumference of the respective magnetic disk, so as to pull up the respective magnetic head.

The head actuator includes two suspensions located between first and second magnetic disks opposing to each other. The ramp includes a first guide with which a first engagement member engages, the first engagement member extending from an end of the suspension located on the first magnetic disk side, of the two suspensions, and a second guide with which a second engagement member engages, the second engagement member extending from an end of the suspension located on the second magnetic disk side.

The first guide is located closer to the second magnetic disk than the second guide, and the second guide is located closer to the first magnetic disk than the first guide.

The first engagement member and the second engagement member are located on a center axis of the respective suspensions, and they respectively have first and second contact portions which are engageable with the first and second guides.

With the magnetic disk apparatus having the above-described structure, of a plurality of engagement members in the ramp loading mechanism, the first and second engagement members provided on the two suspensions located between the first and second magnetic disks which are adjacent to each other, are formed such that its up-and-down relationship is switched. Accordingly, the first and second guides of the ramp are arranged such that the positions of these guides are switched in the up-and-down direction. Therefore, the first and second contact portions of the first and second engagement members are made to pass through a gap between the surface of the magnetic disk and the ramp, thus decreasing the gap between the first and second guides. As a result, it becomes possible to assure a large interval between the guide of the ramp and the surface of the magnetic disk. Therefore, even if the number of magnetic disks mounted is increased, the interval between the ramp and the surface of the magnetic disk can be sufficiently maintained. In this manner, the contact between the ramp and a magnetic disk, which might occur while assembling or when the apparatus undergoes a shock, thus making it possible to improve the reliability.

Further, according to the magnetic disk apparatus of the present invention, the head actuator includes two suspensions located between first and second magnetic disks opposing to each other. The ramp of the ramp loading mechanism includes a first guide with which a first engagement member engages, the first engagement member extending from an end of the suspension located on the first magnetic disk side, of the two suspensions, and a second guide with which a second engagement member engages, the second engagement member extending from an end of the suspension located on the second magnetic disk side. The first guide is located closer to the second magnetic disk than the second guide, and the second guide is located closer to the first magnetic disk than the first guide. Furthermore, the first engagement member and the second engagement member respectively have first and second contact portions which are brought into contact with the first and second guides, respectively, and are provided to apart from each other by a predetermined interval in the direction of the movement of the magnetic heads. Thus, the first and second guides are provided to apart from each other by the predetermined interval in the direction of the movement of the magnetic heads.

In the magnetic disk apparatus having the above-described structure, the first and second engagement members are arranged to be apart from each other in the moving direction of the magnetic head, so as to avoid the interference between the first and second engagement members. Further, the first and second members corresponding to these are similarly arranged to be apart from each other by a similar interval in the moving direction of the magnetic head. With this structure, the two magnetic heads can be operated by the same load/unload timing. Thus, data can be recorded and reproduced efficiently without wasting a data recording area in the first and second magnetic disk.

Moreover, according to the magnetic disk apparatus of the present invention, the head actuator includes two suspensions located between first and second magnetic disks opposing to each other. The ramp of the ramp loading mechanism includes a first guide with which a first engagement member engages, the first engagement member extending from an end of the suspension located on the first magnetic disk side, of the two suspensions, and a second guide with which a second engagement member engages, the second engagement member extending from an end of the suspension located on the second magnetic disk side. The first guide is located closer to the second magnetic disk than the second guide, and the second guide is located closer to the first magnetic disk than the first guide.

Further, the first guide is projecting with respect to the surface of the second magnetic disk by a predetermined height, and extending such that the distance to the rotation center of the head actuator varies, whereas the second guide is projecting with respect to the surface of the first magnetic disk by a predetermined height, and extending such that the distance to the rotation center of the head actuator varies.

The first engagement member and the second engagement member respectively have first and second contact portions which are brought into contact with the first and second guides, respectively, and extend to be tilted with respect to the surfaces of the first and second magnetic disks, respectively.

With the magnetic disk apparatus having the above-described structure, the contact portions of the first and second engagement members are provided to incline. With this structure, the inclined portions of the guides can be omitted, and it becomes possible to further increase the distance between the surface of the magnetic disk and each guide.

Thus, according to the present invention, it is possible to provide a high-reliability magnetic disk with which the magnetic head can be accurately held at a predetermined retreated position, and the gap between the ramp and the surface of a magnetic disk is expanded without deteriorating the high-density mounting degree, thereby making it possible to prevent the contact between the ramp and the magnetic disk while assembling the apparatus or when the apparatus undergoes a mechanical shock.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 9 show a hard disk drive according to a first embodiment of the present invention, in which:

FIG. 1 is a perspective view showing the hard disk drive;

FIG. 2 is a plan view showing the positions of a head actuator and a ramp with relative to each other, in the hard disk drive;

FIG. 3 is a plan view showing a tip end portion of a suspension of the head actuator and a tab of a ramp loading mechanism;

FIG. 4 is a plan view showing the hard disk drive in a state in which the head actuator is moved to an retreated position;

FIG. 5 is a cross sectional view showing the tip end portions of the suspensions of the head actuator in a disk-loaded state and the ramp loading mechanism;

FIG. 6 is a lateral view showing the positions of the ramps of the ramp loading mechanism and magnetic disks with relative to each other;

FIG. 7 is a plan view showing the hard disk drive in a state in which the head actuator is moved to an retreated position;

FIG. 8 is a cross sectional view showing the positions of the tabs and the ramps with relative to each other, in a state in which the head actuator is moved to an retreated position;

FIG. 9 is a schematic diagram illustrating the movement of a tab with respect to the guide surface of the ramp;

FIGS. 13 to 18 show a hard disk drive according to a third embodiment of the present invention, in which FIG. 13 is a plan view showing a tip end portion of a suspension of the head actuator and a tab of a ramp loading mechanism in this hard disk drive;

FIG. 14 is a perspective view showing the tip end portion of the suspension of the head actuator and the tab of the ramp loading mechanism;

FIG. 15 is a cross sectional view showing the positions of the head actuator and the ramp with relative to each other;

FIG. 16 is a plan sectional view showing the positions of the head actuator and the ramp with relative to each other;

FIG. 17 is a perspective view showing the ramp of the ramp loading mechanism; and FIG. 18 is a cross sectional view showing the positions of the tabs and the ramps with relative to each other, in a state in which the head actuator is moved to an retreated position.

DETAILED DESCRIPTION OF THE INVENTION

Embodiments of the present invention will now be described in detail in connection with the cases where the invention is applied to a hard disk drive (to be abbreviated as HDD hereinafter) serving as a magnetic disk apparatus.

Figure 1:
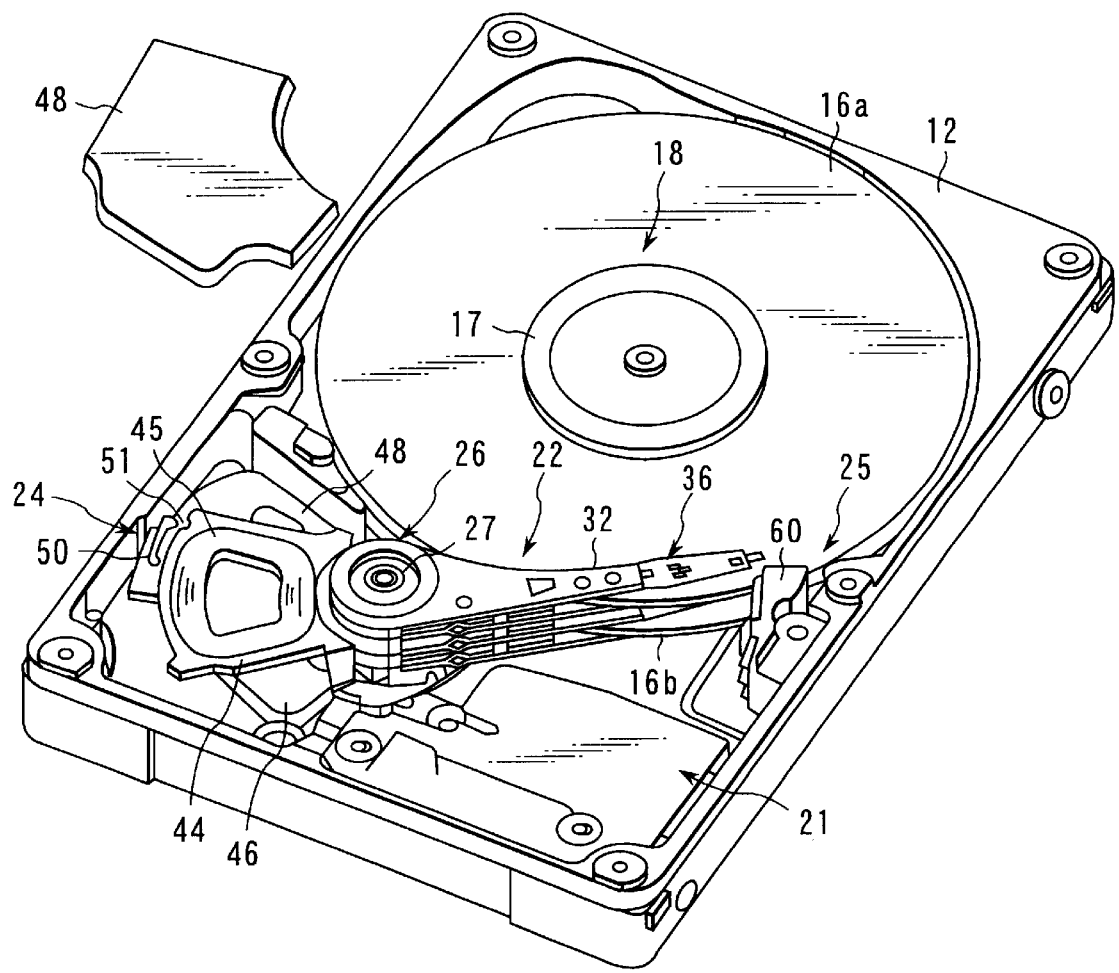

As shown in FIG. 1, a HDD has a case 12 having a rectangular box shape with an opened top, and a top cover (not shown) fixed to the case with a plurality of screws, for closing the opened top of the case.

In the case 12 are arranged two magnetic disks 16a and 16b serving as magnetic recording media, a spindle motor 18 as drive means for supporting and rotating the magnetic disks, a plurality of magnetic heads for writing and reading data with respect to the magnetic disks, a head actuator 22 supporting these magnetic heads movably with respect to the magnetic disks 16a and 16b, a voice coil motor (to be called VCM hereinafter) 24 for rotating and positioning the head actuator, a ramp loading mechanism 25 for holding the magnetic heads at an retreated position set apart from the magnetic disks when the magnetic heads are moved to the outermost circumference of the magnetic disks, an inertia latch mechanism for latching the head actuator to an retreated position against a shock or the like, and a substrate unit 21 having a head IC or the like.

Further, on an outer surface of the bottom wall of the case 12, a print circuit board (not shown) for controlling the operations the spindle motor 18, VCM 24 and the magnetic heads via the substrate unit 21, is fixed with screws.

Each of the magnetic disks 16a and 16b is formed to have a diameter of 65 mm (2.5 inches), and has magnetic recording layers on upper and lower surfaces. The two magnetic disks 16a and 16b are fitted to the outer circumference of a hub (not shown) of the spindle motor 18, and further fixed and held by a clamp spring 17. Thus, the two magnetic disks 16a and 16b are arranged coaxially in layers at predetermined intervals. With this structure, as the spindle motor 18 is driven, the magnetic disks 16a and 16b are rotated in an integral manner at a predetermined speed.

Figure 2:
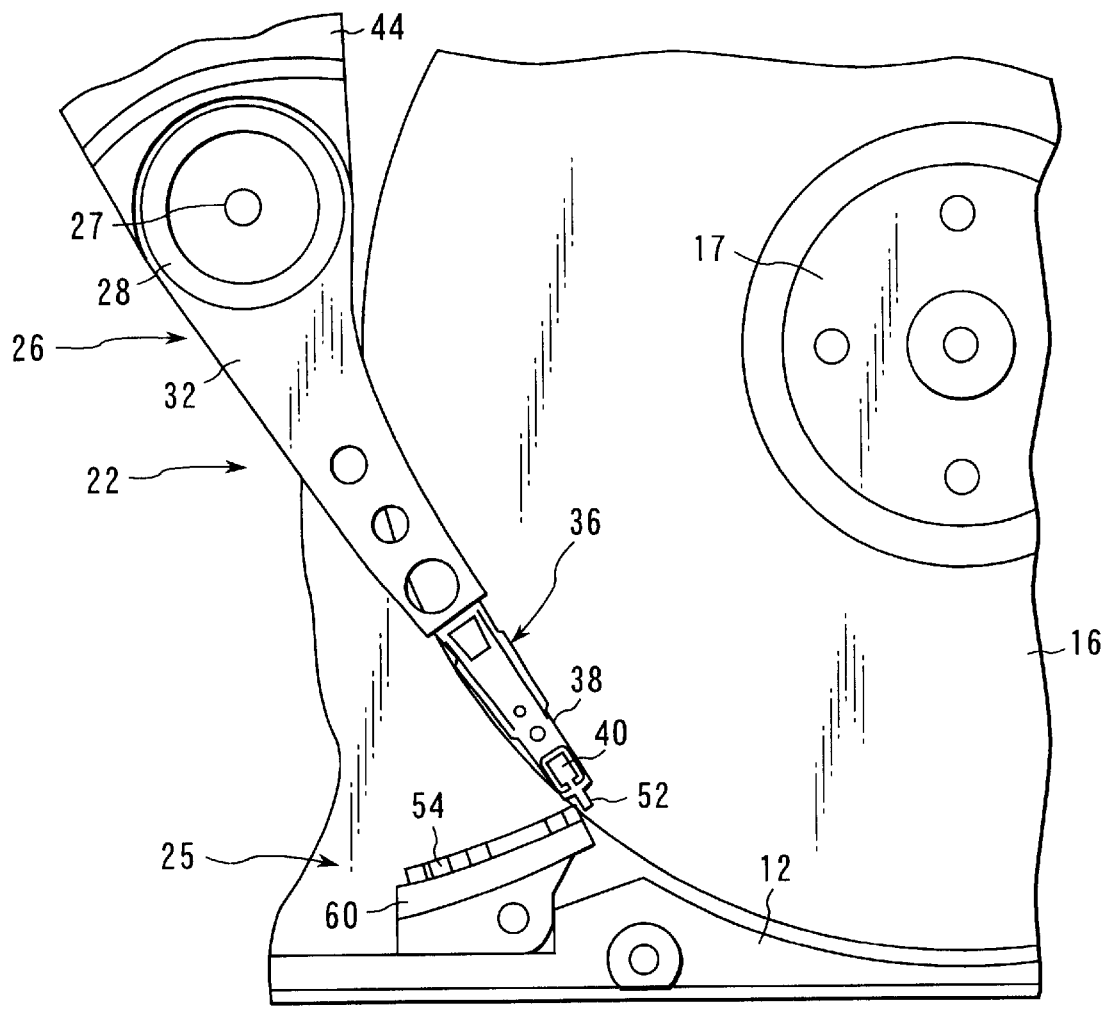
Figure 3:
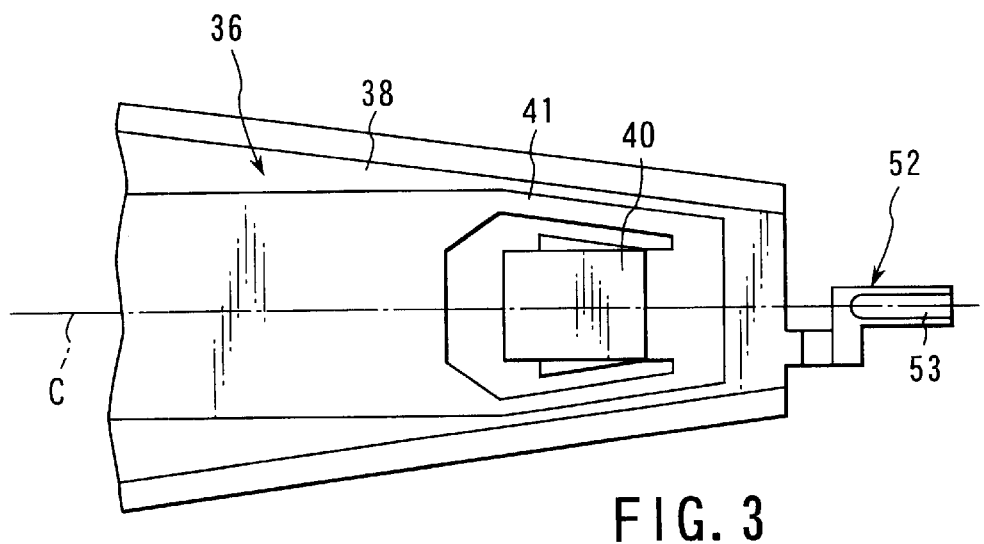

As shown in FIGS. 1 and 2, the head actuator 22 includes a bearing assembly 26 mounted on the bottom wall of the case 12. The bearing assembly 26 includes a pivot 27 stood vertically with respect to the bottom wall of the case 12, and a cylindrical hub 28 rotatably supported by the pivot via a pair of bearings. The head actuator 22 includes four arms 32 and a plurality of spacer rings which are mounted on the hub 28, and a magnetic head assembly 36 supported by the respective arms.

The arms 32 are fitted to the outer circumference of the hub 28 in a layered state, by putting the hub 28 of the bearing assembly 26 through a through hole formed in the proximal section of each arm. Thus, the four arms 32 are set in parallel with each other at predetermined intervals therebetween, and extending in the same direction from the hub 28.

As shown in FIGS. 2 to 5, each of the magnetic head assemblies 36 includes a plate-like suspension 38 which is elastically deformable, and a magnetic head 40 fixed to the tip end of the suspension. The suspension 38 is made of a plate spring, and the proximal end thereof is fixed to the tip end of the arm 32 by spot welding or adhesion, to extend from the arm. It should be noted that the suspension 38 may be formed together with the respective arm 32 in an integral manner.

Each of the magnetic heads 40 has a substantially rectangular-shaped slider and a recording/reproducing MR (magnetic resistance) head formed on the slider, and it is fixed to a gimbal spring 41 provided at the tip end of the suspension 38. Further, to each of the magnetic heads 40, a load is applied to urge it to the magnetic disk side via a dimple 42 formed on the suspension 38.

In the meantime, the head actuator 22, as shown in FIG. 1, has a support frame 44 extending from the bearing assembly 26 towards the direction opposite to the arms 32, and a voice coil 45 which constitutes a part of the VCM 24 is supported by the support frame. The support frame 44 is formed of a synthesis resin to be integral with an outer circumference of the voice coil 45. Further, the support frame 44 has a recess 51 to engage with a latch nail 50 of the inertia latch mechanism.

As can be seen in FIGS. 1 to 5, the magnetic disks 16a and 16b are located between two adjacent arms 32 in a state where the head actuator 22 having the above-described structure is built in the case 12. Four magnetic heads 40 mounted on four suspensions 38 respectively face the upper and lower surfaces of the magnetic disks 16a and 16b, thus each magnetic disk is sandwiched between two magnetic heads from both sides. Two magnetic heads located between two magnetic disks 16a and 16 are arranged in such a manner that their back sides face each other. To each of the magnetic heads 40, a predetermined gram load is applied towards the surface of the magnetic disk via the dimple 42 by the spring force of the suspension 38.

Further, as shown in FIG. 1, the voice coil 45 fixed to the support frame 44 of the head actuator 22 is located between a pair of yokes 48 fixed on the case 12, and the coil constitutes the VCM 24, together with these yokes, and a magnet 46 fixed to one of the yokes. As an electricity is applied to voice coil 45, the head actuator 22 is pivoted, and the magnetic head 40 is moved and position on a desired track on a magnetic disk 16.

As shown in FIGS. 1 to 5, the ramp loading mechanism 25 includes a ramp 60 provided on the bottom wall of the case 12 and on an outer side of the magnetic disks 16a and 16b, and a tab 52 extending from the tip end of each suspension 38. When the head actuator 22 rotates to the retreated position located on the outside of the magnetic disks 16a and 16b, each tab 52 engages with the ramp surface formed on the ramp 60, which will be explained later, and then the tab is pulled up by the slope of the ramp surface, thus unloading the magnetic head.

Of a plurality of tabs 52, those tabs 52 provided on two suspensions 38 located between two magnetic disks 16a and 16b adjacent to each other, are arranged such that their up-and-down relationship is switched. Accordingly, the guide surfaces of the ramp 60 are set such that their up-and-down relationship are switched.

More specifically, each tab 52 extends from the tip end of the suspension at a location displaced from a center axis C of the suspension, towards the direction away from the surface of the magnetic disk corresponding to the suspension, and then bends. In this manner, the extending end portion of each tab 52 extends in substantially parallel with the surface of the magnetic disk and is aligned with the center axis C of the suspension. As described later, the extending end portion of each tab 52 constitutes a contact portion 53 which is to be engaged with a guide surface of the ramp 60.

Here, of two magnetic head assemblies 36 located between two magnetic disks 16a and 16b adjacent to each other, one head assembly which carries out data processing with respect to the lower surface of an upper-side magnetic disk 16a (a first magnetic disk) is regarded as an upper side magnetic head assembly 36u, whereas the other assembly which carries out data processing with respect-to the upper surface of a lower-side magnetic disk 16b (a second magnetic disk) is regarded as a lower side magnetic head assembly 36d. Please note that, structural elements and tabs of the upper-side magnetic head assembly 36u are denoted by reference numerals suffixed with "u", and structural elements and tabs of the lower-side magnetic head assembly 36d are denoted by reference numerals suffixed with "d", thus they are distinguished.

Figure 4:
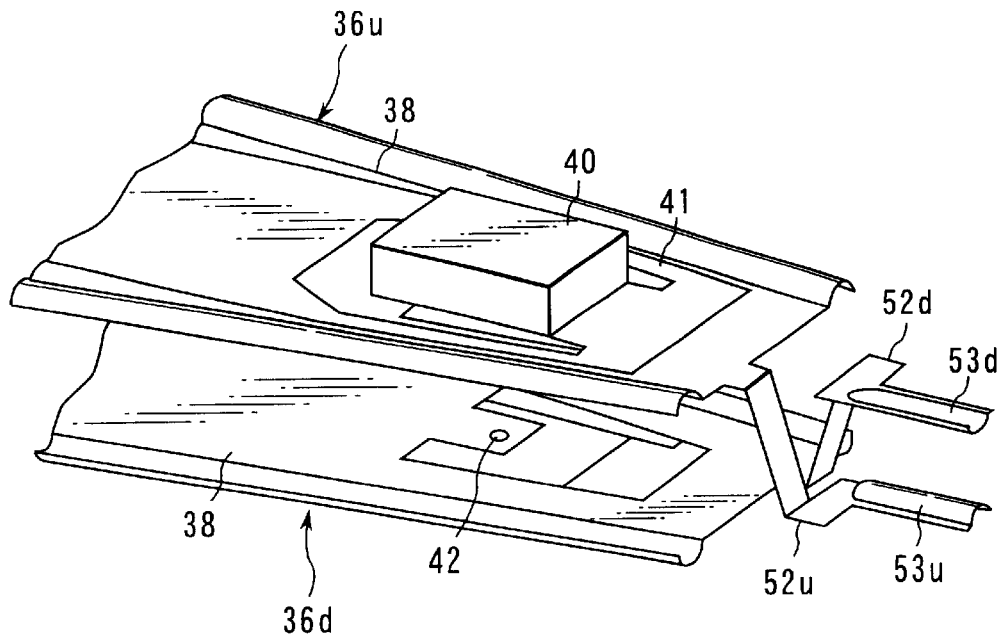
Figure 5:
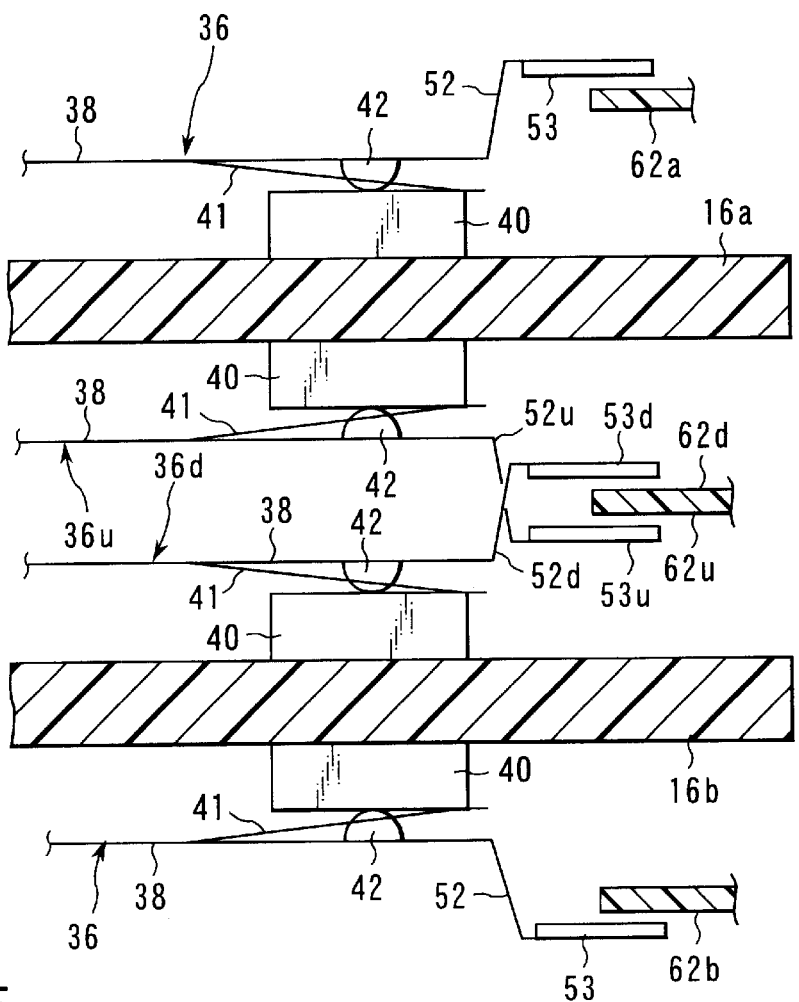

As can be seen in FIGS. 4 and 5, an upper-side tab 52u (a first engagement member) provided in the upper-side magnetic head assembly 36u extends towards the upper surface of the lower-side magnetic disk 16b, and a lower-side tab 52d (a second engagement member) provided in the lower-side magnetic head assembly 36d extends towards the lower surface of the upper-side magnetic disk 16a. Further, these upper-side and lower-side tabs 52u and 52d extend without interfering with each other. The contact portions 53u and 53d (first and second contact portions) provided in their extending end portions face each other in such a manner that the upper-and-lower relationship is switched, and they are aligned with the center axis of the suspensions 38, respectively.

Figure 6:
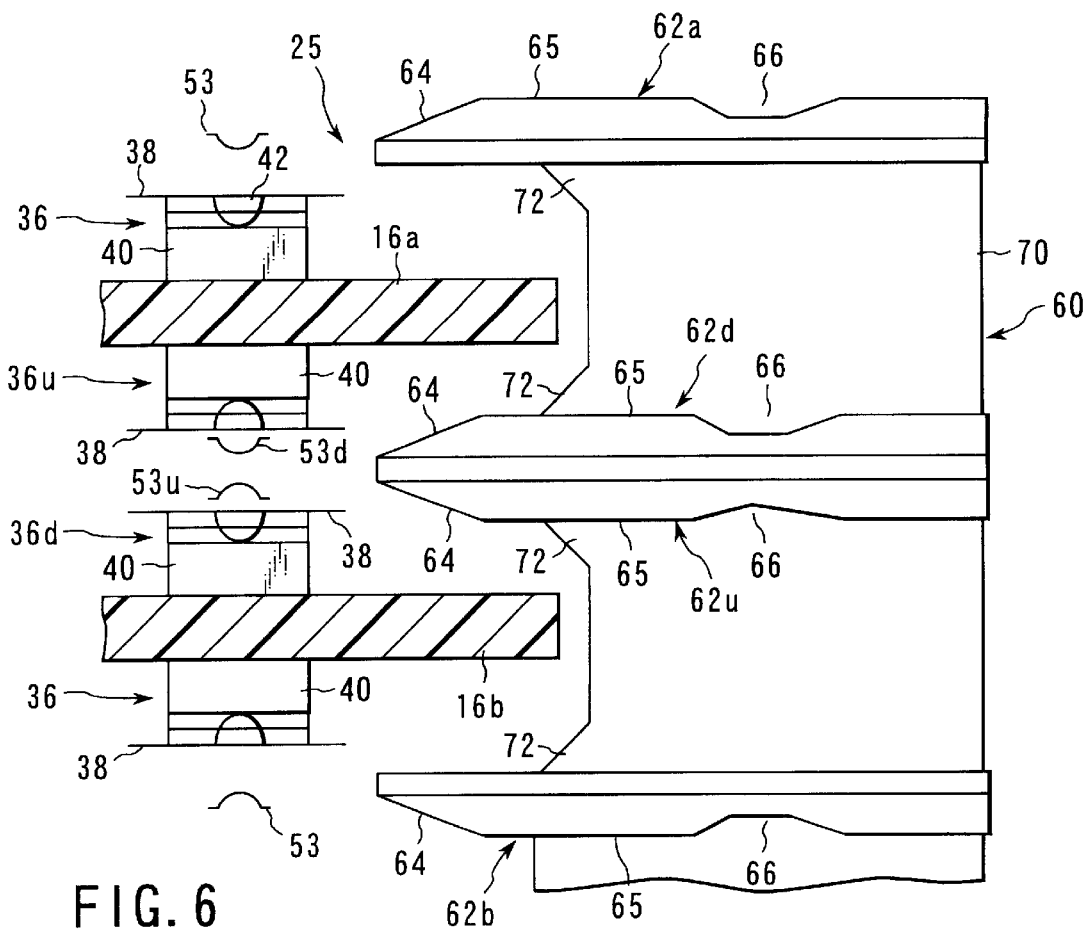

As shown in FIGS. 5 and 6, the ramp 60 has four guide surfaces 62a, 62d, 62u and 62b for guiding tabs 52 provided on four suspensions 38 of the head actuator 22 while the magnetic heads 40 come off from the circumferences of the magnetic disks 16a and 16b to move to predetermined retreated positions while HDD is not in operation.

These guide surfaces 62a, 62d, 62u and 62b are arranged along the axial direction of the magnetic disks 16a and 16b at predetermined intervals therebetween, and they are arranged to match the height of the tabs 52 of the respective suspensions 38. Further, the guide surfaces 62a, 62d, 62u and 62b extend substantially in the radial direction, and are arranged on the transfer paths of the tabs 52 provided on the suspensions 38. Further, the end portions of the guide surfaces 62a, 62d, 62u and 62b are located to overlap the surfaces of the outer circumference portions of the magnetic disks 16a and 16b.

The guide surface 62a corresponding to the uppermost suspension 38 is formed to face upwards, and the guide surface 62b corresponding to the lowermost suspension 38 is formed to face downwards. The guide surface 62u (a first guide) corresponding to the upper-side tab 52u of the upper-side magnetic head assembly 36u, and the guide surface 62d (a second guide) corresponding to the lower-side tab 52d of the lower-side magnetic head assembly 36d are placed to face the two magnetic disks 16a and 16b, and the upper and lower relation between these guide surfaces are switched. In other words, the guide surface 62u corresponding to the upper-side tab 52u is situated below the guide surface 62d corresponding to the lower-side tab 52d, and is set adjacent to the upper surface of the lower-side magnetic disk 16b. On the other hand, the guide surface 62d corresponding to the lower-side tab 52d is situated above the guide surface 62u corresponding to the upper-side tab 52u, and is set adjacent to the lower surface of the upper-side magnetic disk 16a.

Each of the guide surfaces 62a, 62d, 62u and 62b has an inclined surface 64 inclined to the surfaces of the magnetic disks 16a and 16b, for loading/unloading the respective magnetic head 40 on/from the magnetic disk, a flat portion 65 continued from the inclined surface 64, extending in parallel with the surface of the magnetic disk, and a recess 66 formed in the flat portion 65, where the tab 52 falls in when the magnetic head moves to its retreated position.

It should be noted that, as shown in FIG. 6, the ramp 60 has a base section 70 which joins the guide surfaces 62a, 62d, 62u and 62b together. In the base section 70, at positions which are adjacent to and faces the outer circumferential portions of the magnetic disks 16a and 16b, projections are formed by, for example, chamfering or R process. By providing these projections 72, if the magnetic disk 16a and 16b are shaken as some shock is applied to the HDD, the sections of the contact between the magnetic disk and the ramp 60 are limited to the outer circumferential portions of the disk and the projections 72, thus preventing damages to the data recording surface of the magnetic disks as well as the ramp surface.

With the HDD having the above-described structure, in a normal operation as shown in FIG. 1, the head actuator 22 is pivoted by the VCM 24, thus the magnetic heads 40 are moved on predetermined tracks of the magnetic disks 16a and 16b, and recording or reproduction of data is carried out with respect to the magnetic disks.

Figure 7:
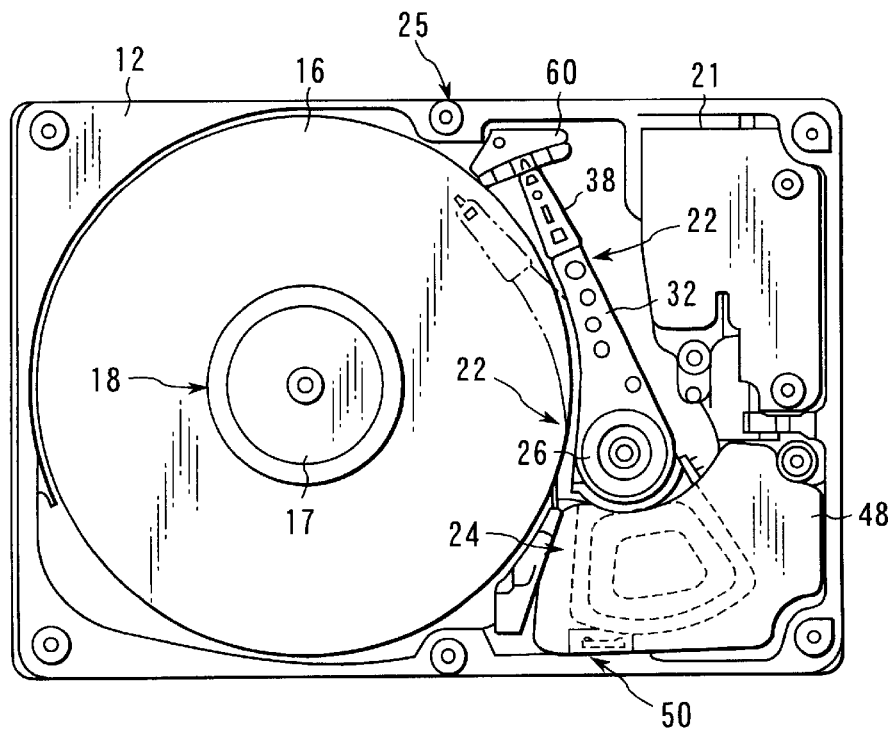

Further, as shown in FIG. 7, when the HDD shifts it mode to the non-operation state, the head actuator 22 is pivoted by the VCM 24 towards the retreated position indicated by a solid line, and the magnetic heads 40 are moved from the inner circumferential side of the magnetic disks 16a and 16b towards the outermost circumference. When the magnetic heads 40 reach near the outer circumferences of the magnetic disks 16a and 16b, the contact portions 53, 53u and 53d of the tabs 52, 52u and 52d extending from the suspensions 38, respectively, ride on the guide surfaces 62a, 62d, 62u and 62b of the ramp 60, as shown in FIGS. 8 and 9.

Then, each of the contact portions 53, 53u and 53d moves in the direction away from the surfaces of the magnetic disks 16a and 16b along the inclined surface 64 of the corresponding guide surface, and moves up on the flat portion 65. Further, each contact portion slides on the flat portion 65 of the guide surface, and when the magnetic head 40 reaches the retreated position, the contact portion falls in the recess 66 of the guide surface to stop.

It should be noted that when the mode of the HDD is shifted back to an operation state, the head actuator 22 is pivoted towards the inner circumferential side of the magnetic disks 16a and 16b from the retreated position while the magnetic disks are being rotated. Then, the tab 52 of each suspension 38 moves from the recess 66 of the respective guide surface onto the flat portion 65, and further slides down the inclined surface 64. Accordingly, the magnetic heads 40 move, and are loaded on the surfaces of the magnetic disks 16a and 16b.

With the HDD having the above-described structure, the magnetic heads 40 can be held at positions distant from the magnetic disks 16a and 16b by the ramp loading mechanism 25 when it is not in operation. Therefore, even if some external shock is applied to the HDD, the alignment error of the magnetic heads, the collision between a magnetic head and a magnetic disk, and the like can be prevented.

Further, with the above-described HDD, in the ramp loading mechanism 25, of a plurality of tabs 52, tabs 52u and 52d provided on two suspensions 38 located between two magnetic disks 16a and 16b adjacent to each other, are arranged such that their positions in the up-and-down relationship are switched. Accordingly, the guide surfaces 62u and 62d of the ramp 60 are arranged such that their positions in the up-and-down relationship are switched. Each of the contact portions 53u and 53d of the tabs 52u and 52d passes through the gap between the surface of the magnetic disk and the corresponding guide surface 62u or 62d of the ramp 60. Thus, as shown in FIG. 9, an interval Y between the guide surfaces 62u and 62d can be reduced. consequently, a clearance between the guide surface 62d of the ramp 60 and the surface of the magnetic disk 16a, and a clearance between the guide surface 62u and the surface of the magnetic disk 16b, can be kept large.

Therefore, even if the number of magnetic disks mounted is increased, the clearance between the ramp and the surface of a disk can be kept at a sufficient distance. Therefore, the contact between the ramp and the magnetic disk, which is likely to occur while assembling the apparatus and when a shock is applied thereto, can be prevented, and thus the reliability can be improved.

Further, according to this embodiment, the contact portion 53 of each tab, which engages with the guide surface of the ramp is located on the center axis c of the corresponding suspension 38. With this structure, it becomes possible to prevent rolling of suspensions when loading or unloading, thus making it possible to avoid the collision between the surface of a magnetic disk and a corresponding magnetic head.

Figure 10:
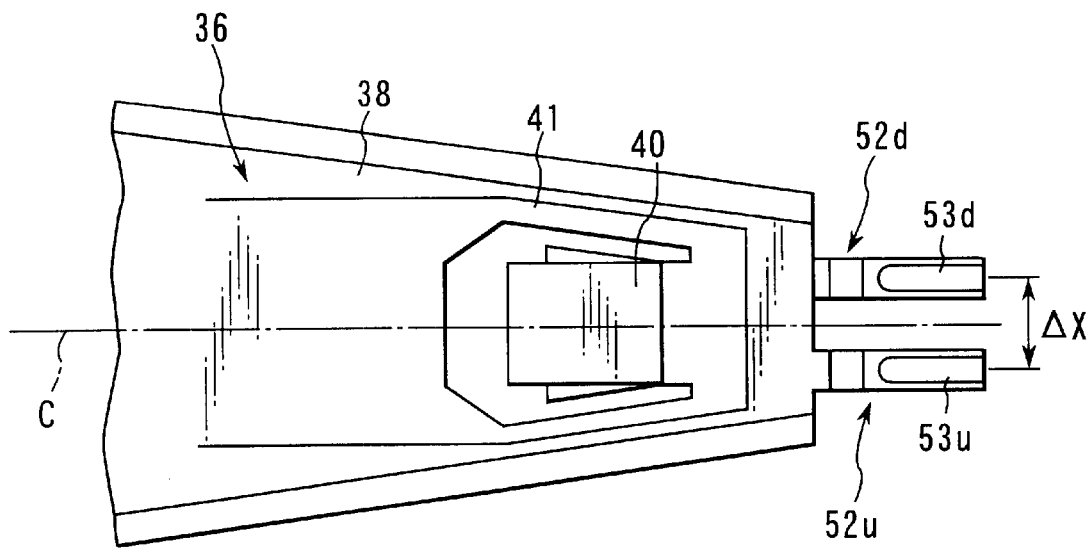
FIG. 10 is a plan view showing a tip end portion of a suspensions of a head actuator and a tab of a ramp loading mechanism in a hard disk drive according to a second embodiment of the present invention.
Figure 11:
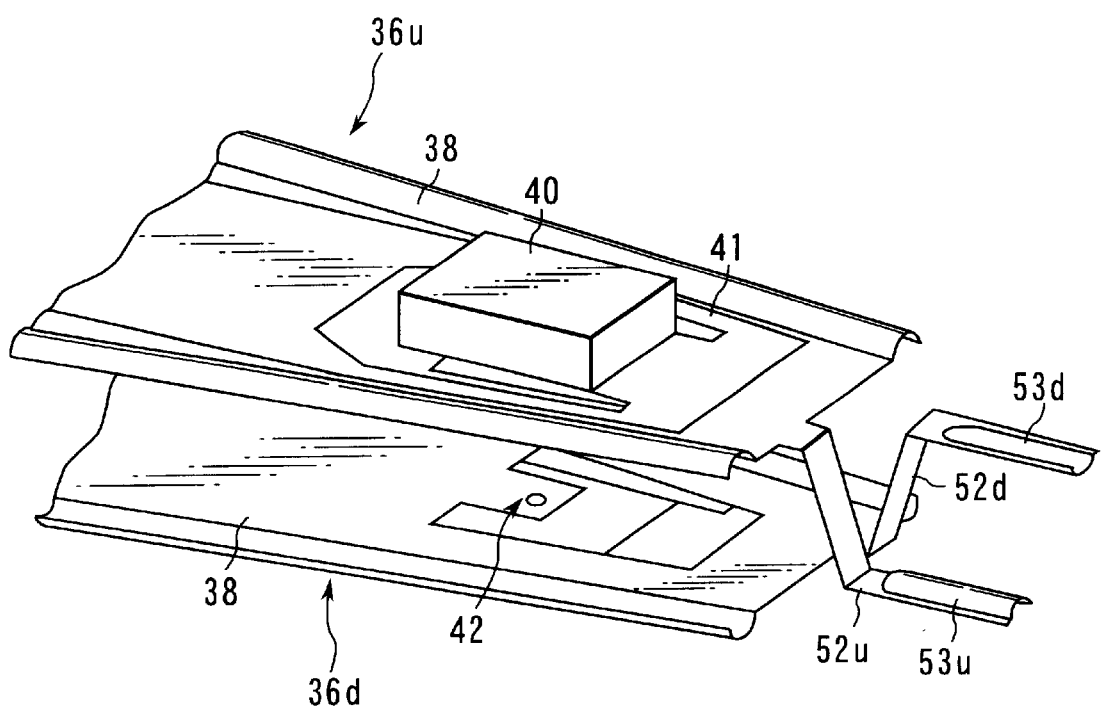
FIG. 11 is a schematic diagram illustrating the tip end portion of the suspensions of the head actuator and the tab of the ramp loading mechanism in the second embodiment.

In the above-described embodiment, the tab extending from the extending end of each suspension is formed such that the contact portion thereof is located on the center axis of the suspension. However, as in a second embodiment shown in FIGS. 10 and 12, it is also possible that the contact portion 53 of each tab is kept displaced from the center axis C in the direction perpendicular to the center axis C. In particular, the upper-side tab 52u and the lower-side tab 52d of the suspensions 38 of the upper-side magnetic head assembly 36u and the lower-side magnetic head assembly 36u, which are situated between two magnetic disks 16a and 16b adjacent to each other, are situated to be apart on both sides of the center axis C. The contact portions 53u and 53d are set apart from each other by a distance $\Delta x$ in the direction perpendicular to the center axis C, that is, in the direction of the movement of the magnetic heads 40.

With the above-described structure, the tabs 52u and 52d are displaced from each other in the direction of the movement of the magnetic head 40, and therefore they can be operated smoothly without interfering with each other. Further, the shape of each tab becomes simple, thus making it possible to improve the productivity.

With this structure, since each tab 52 is located displaced from the center axis C of the suspension 38, a reaction force from the ramp 50 while loading/unloading is applied to a position displaced from the center axis C of the suspension. As a result, each suspension 38 and magnetic head 40 are rolled. Under these circumstances, the upper-side tab 52u and the lower-side tab 52d are placed near the center axis C of the suspension 38 in a minimum range where they do not interfere with each other. In this manner, the damage caused by the rolling of the magnetic head 40, which occurs while loading or unloading, can be limited within an allowable range.

Further, in the second embodiment, the upper-side tab 52u and the lower-side tab 52d are displaced by a distance $\Delta x$ in the direction of the movement of the magnetic heads 40. Therefore, if the same ramp 60 as that of the first embodiment is used, the timing of contact of the contact portions of the tabs 52u and 52d with respect to the guide surfaces of the ramp varies, and accordingly the timing for loading/unloading the upper-side magnetic head and lower-side magnetic head varies. In this case, the data recording region of a magnetic disk corresponding to a magnetic head which is pulled up earlier cannot be fully used up to the outer circumferential portion of the magnetic disk, thus creating an unused section in the data recording region, which is a waste.

Figure 12:
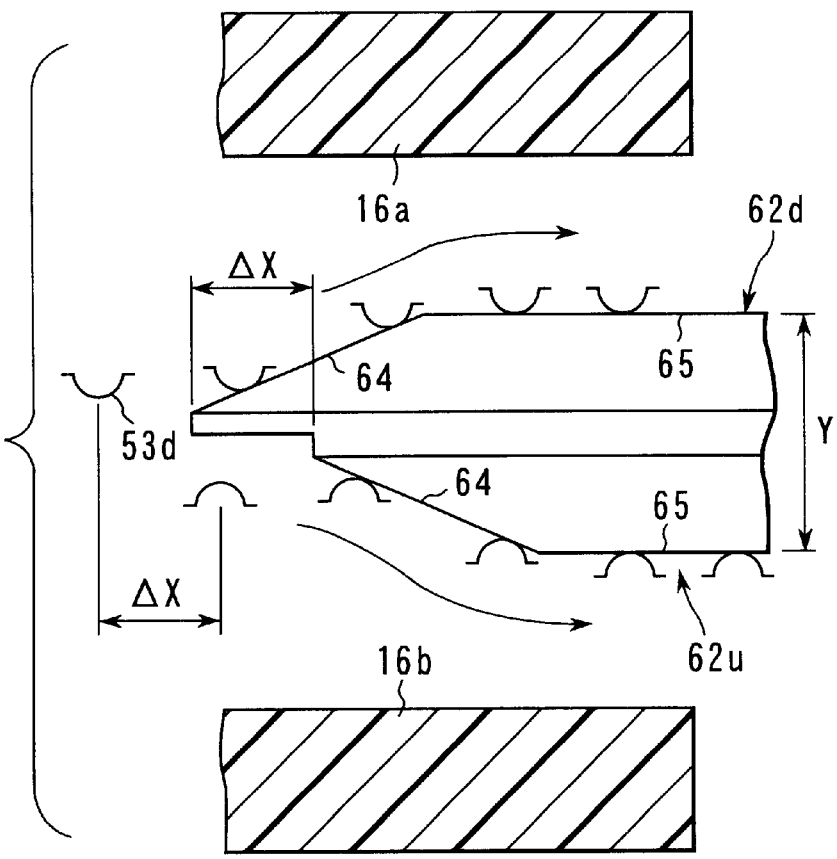
FIG. 12 is a schematic diagram illustrating the movement of the tab with respect to the guide surface of the ramp in the second embodiment.

Under these circumstances, in the second embodiment, the shape of the ramp 60 is contrived to match the timings for loading and unloading the upper-side magnetic head and the lower-side magnetic head. More specifically, as shown in FIG. 12, the guide surface 62u of the ramp 60 corresponding to the upper-side tab 52u, and the guide surface 62d corresponding to the lower-side tab 52d are formed to be displaced by a predetermined distance in the direction of the movement of the magnetic heads 40. The amount of displacement $\Delta x$ is made to be equal to the distance $\Delta x$ between the upper-side tab 52u and the lower-side tab 52d.

With the above-described structure, the timings for loading and unloading the upper- and lower-side magnetic heads can be synchronized. Thus, the data recording region of each magnetic disk can be used up efficiently to the outermost circumference of each magnetic disk.

The other part of the structure is the same as that of the first embodiment. The same structural elements are designated by the same reference numerals, and the detailed description thereof will be omitted. In the second embodiment, the same advantage as that of the first embodiment can be obtained.

FIGS. 13 to 18 show a third embodiment of the present invention. In this embodiment, there is no inclined surface formed in each guide surface of the ramp 60, but each tab is inclined in place, to constitute an inclined portion. Then, as the head actuator is pivoted, the position of the contact between the guide surface and tab, is varied in the radial direction of the rotation of the head actuator. In this manner, the magnetic heads are loaded and unloaded.

Figure 13:
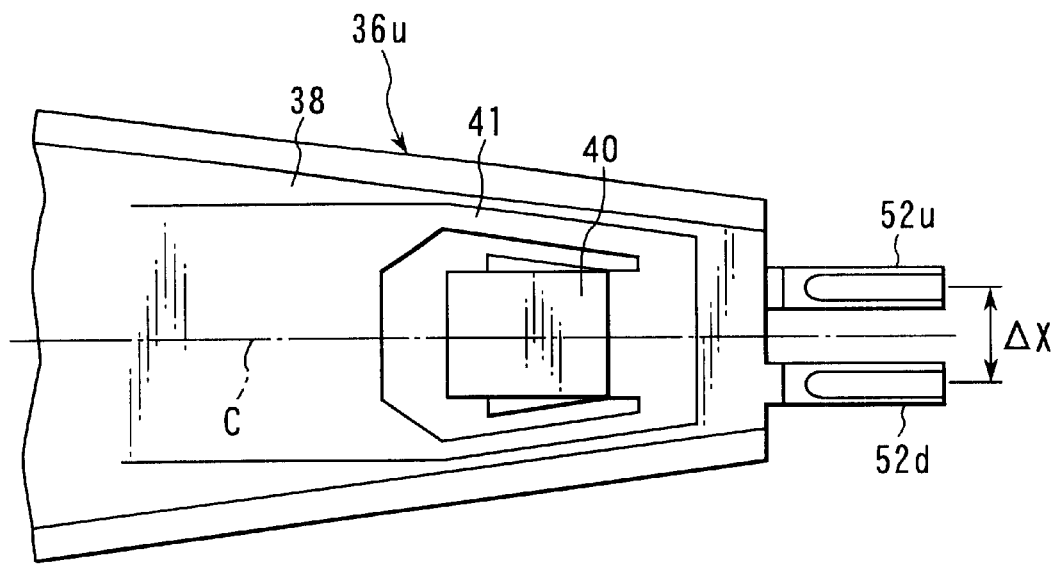
Figure 14:
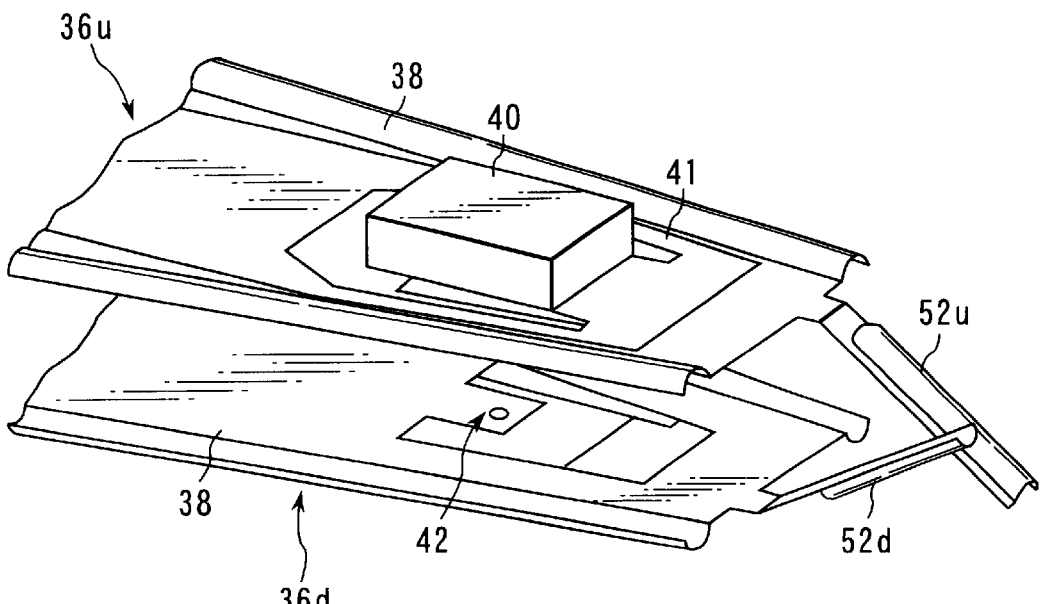
Figure 15:
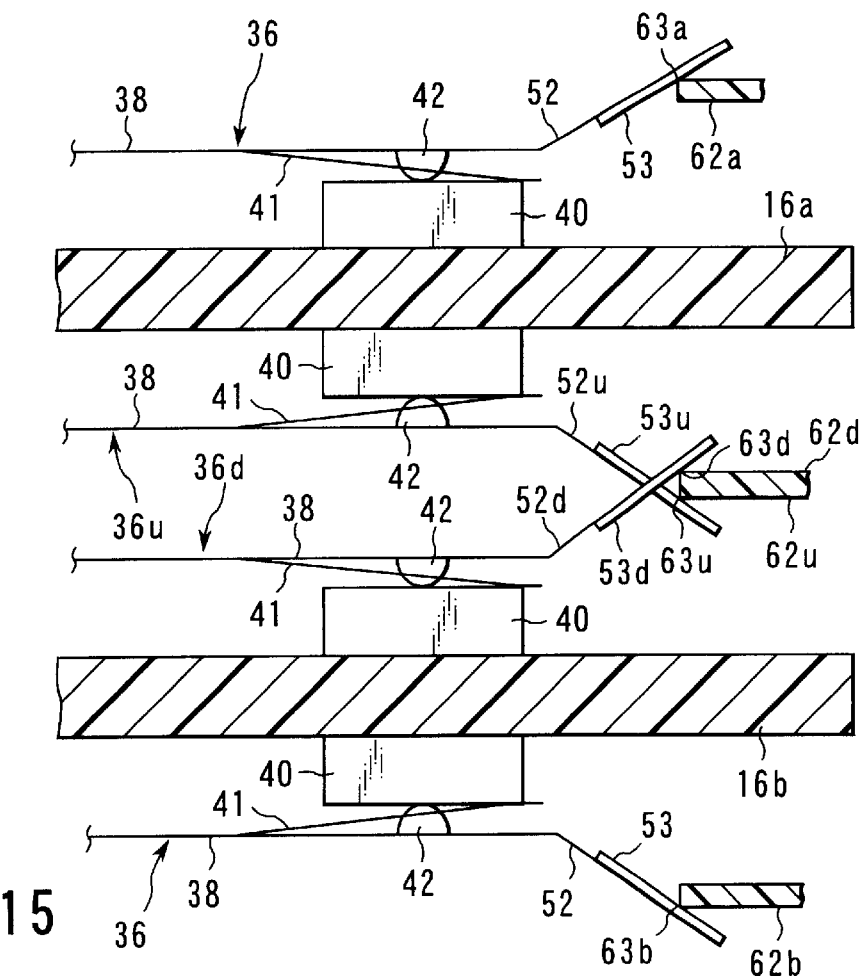

More specifically, as shown in FIGS. 13 to 15, the upper-side tab 52u and the lower-side tab 52d extending from the suspensions 38 of the upper-side magnetic head assembly 36u and the lower-side magnetic head assembly 36u, which are situated between two adjacent magnetic disks 16a and 16b, are arranged to be apart on both sides of the center axis C. These tabs 52u and 52d are set apart from each other by a distance Δx in the direction perpendicular to the center axis C, that is, in the direction of the movement of the magnetic heads 40. Further, the upper-side tab 52u obliquely extends towards the lower-side magnetic disk 16b, and the lower-side tab 52d obliquely extends towards the upper-side magnetic disk 16a. Thus, a contact portion 53u of the upper-side tab 52u and a contact portion 53d of the upper-side tab 52d extend out such that the upper-side and lower-side are switched. Similarly, the other tabs 52 extend obliquely in a direction away from the surface of the corresponding magnetic disk.

Figure 16:
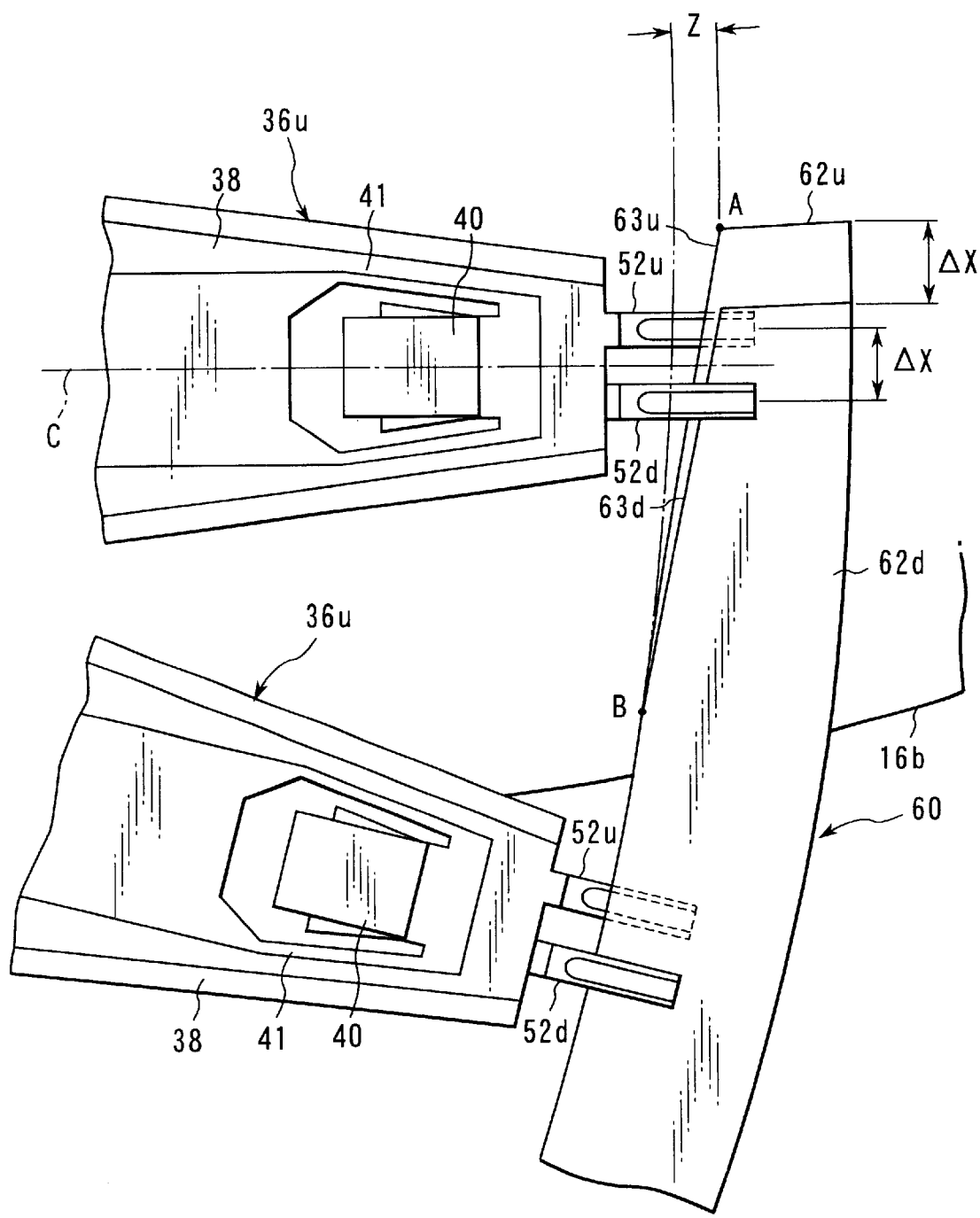
Figure 17:
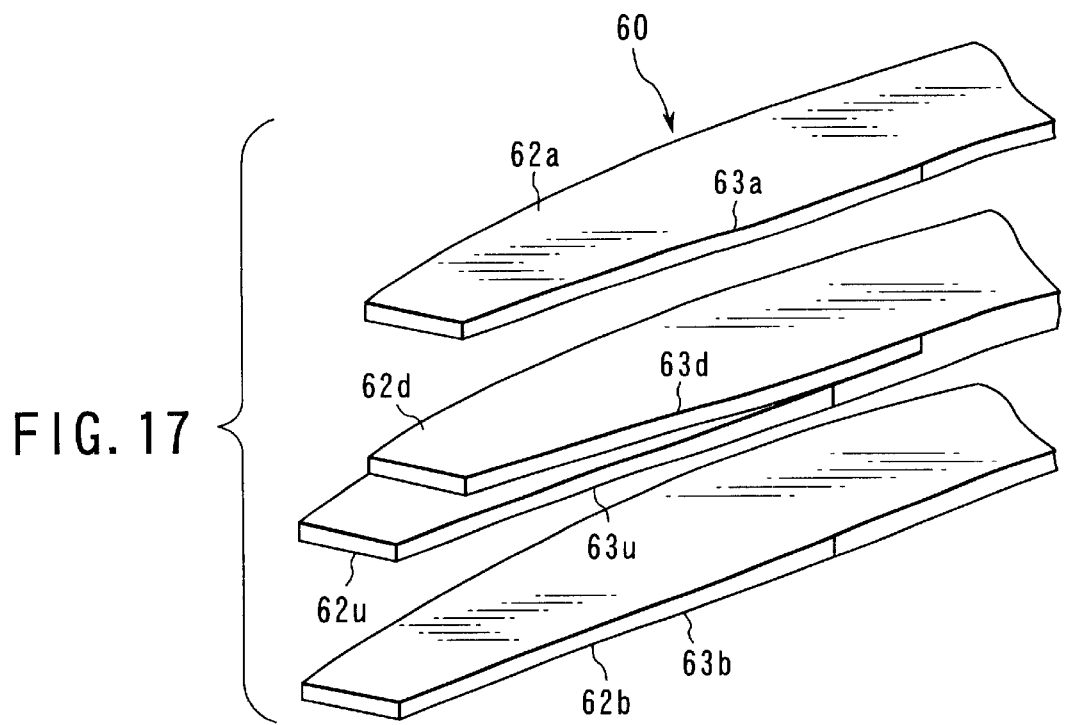

As shown in FIGS. 15 to 17, the guide surfaces 62a, 62d, 62u and 62b of the ramp 60 are each formed to be a flat surface which is in parallel to the surface of the corresponding magnetic disk. The contact portions 53, 53u and 53d of the tabs 52, 52u and 52d are guided as they are brought into contact with edges 63a, 63u, 63d and 63b of the respective guide surfaces 62a, 62d, 62u and 62b.

Figure 18:
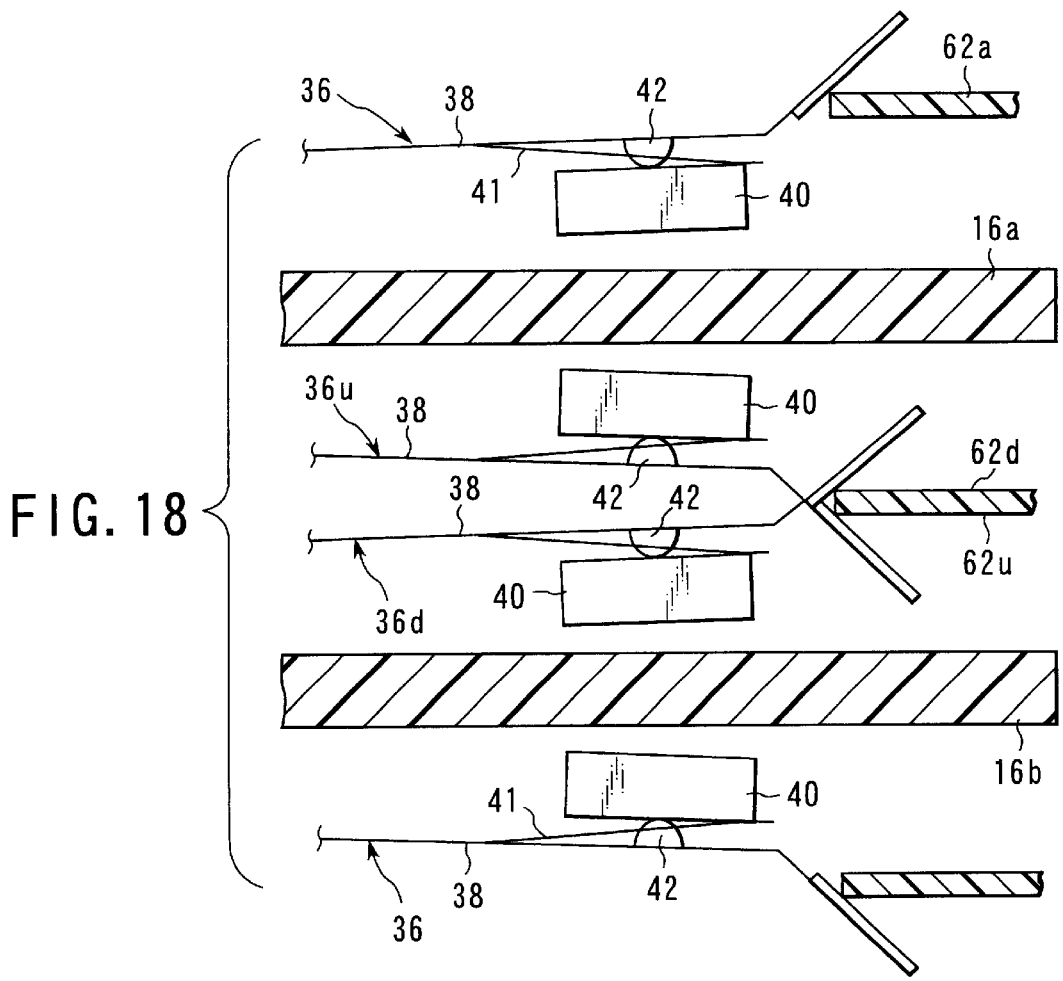

The edges 63a, 63u, 63d and 63b of the guide surfaces each have such a shape that the position of each edge with respect to the rotation center of the head actuator 22 varies to near the rotation center of the head actuator by a predetermined distance z while the magnetic head moves from A to B in FIG. 16 as the head actuator is pivoted. Therefore, the contact position between the contact portion of each tab and the edge of the corresponding guide surface moves towards the proximal side of each tab in accordance with the movement of the magnetic head. Further, since the guide surface is made flat, the height of the contact position between each contact portion and the edge of the corresponding guide surface does not vary. However, as shown in FIGS. 16 and 18, as the head actuator 22 is pivoted from the outer circumference of each magnetic disk towards the retreated portion, the suspensions 38 and magnetic heads 40 are pulled up by means of the inclination of the tabs.

As described before, the upper-side tab 52u and the lower-side tab 52d extending from the suspensions 38 of the upper-side magnetic head assembly 36u and lower-side magnetic head assembly 36u situated between two magnetic disks, are set to be apart from each other by a distance Δx in the direction of the movement of the magnetic head 40 so as to prevent the interference between them. Therefore, the timing of contact of the contact portions of the tabs with respect to the corresponding edges of the guide surfaces varies, and accordingly the timing for loading/unloading the upper-side magnetic head and lower-side magnetic head varies. In this case, the data recording region of the magnetic disk corresponding to a magnetic head which is pulled up earlier cannot be fully used up to the outer circumferential portion of the magnetic disk, thus creating an unused section in the data recording region, which is a waste.

Under these circumstances, as in the second embodiment, the guide surface 62u of the ramp 60, corresponding to the contact portion 53u of the upper-side tab 52u, and the guide surface 62d, corresponding to the contact portion 53d of the lower-side tab 52d are displaced by a predetermined distance in the direction of the movement of the magnetic heads 40. The amount of displacement Δx is made to be equal to a distance Δx between the upper-side tab 52u and the lower-side tab 52d.

With the above-described structure, the contact portion 53u of the upper-side tab 52u and the contact portion 53d of the lower-side tab 52d are brought into contact with the edges 63u and 63d of the guide surfaces 62u and 62d, respectively, at the same time, thus the timings for loading and unloading the upper and lower-side magnetic heads can be synchronized. Thus, the data recording region can be used up efficiently to the outermost circumference of each magnetic disk.

The other part of the structure is the same as that of the first embodiment. The same structural elements are designated by the same reference numerals as in the first embodiment, and the detailed description thereof will be omitted. In the third embodiment, the same advantages as those of the first embodiment can be obtained. Further, according to this embodiment, the guide surfaces of the ramp 60 are made flat, and therefore a space can be created in the axial direction of the magnetic disks for an amount corresponding to the area made by removing the inclined surfaces. Thus, it becomes possible to obtain a larger gap between each guide surface of the ramp and the surface of the corresponding magnetic disk. Consequently, the contact between the ramp 60 and the magnetic disks can be prevented, thus further improving the reliability of the HDD.

It should be noted that the present invention is not limited to the above-described embodiments, and it can be remodeled into various versions as long as the essence of the invention remains in a certain range. For example, the number of magnetic disks, the number of magnetic heads corresponding to these disks, the number of arms can be increased or decreased in accordance with necessity. Thus, it suffices if the number of guide surfaces in the ramp of the ramp loading mechanism is increased or decreased in accordance with an increase or decrease in the number of magnetic heads. Further, even in the case where there is only one magnetic disk, the gap between the ramp and the surfaces of the magnetic disk can be enlarged by applying the present invention. Thus, it is possible to obtain the same advantage as in the above-described embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk device comprising:
    plurality of disks provided at predetermined intervals;
    a head actuator having a plurality of heads for reproducing data from the disks, and a plurality of suspensions supporting the respective heads, for supporting the heads to be movable with respect to the disks about a rotation center; and a ramp loading mechanism for holding the heads at a position distant from the respective magnetic disks when the heads are moved to outer circumference of the disks;

wherein the ramp loading mechanism further includes:

a ramp having a plurality of guides provided near the outer circumferences of the disks and arranged at intervals between each other in an axial direction of the disks, and engagement members provided at ends of the respective suspensions, which engage with the respective guides of the ramp when the respective heads are moved to the outer circumferences of the respective disks, so as to pull away the respective heads from the respective disks;

the head actuator includes two suspensions located between first and second disks opposing each other;

the ramp includes a first guide with which a first engagement member engages, the first engagement member extending from an end of the suspension located on the first disk side, of the two suspensions, and a second guide with which a second engagement member engages, the second engagement member extending from an end of the other suspension located on the second disk side;

the first guide is located closer to the second disk than the second guide, and the second guide is located closer to the first disk than the first guide;

the first guide extends at a certain height with respect to the surface of the second disk and extends such that the distance from the first guide to the rotation center of the head actuator varies, and the second guide extends at a certain height with respect to the surface of the first disk and extends such that the distance from the second guide to the rotation center of the head actuator varies, and the first engagement member and the second engagement member respectively have first and second contact portions which are engageable with the first and second guides, the first contact portion obliquely extends from the suspension toward the second disk, and the first contact portion obliquely extends from the suspension toward the second disk, each as seen when projected onto a plane which contains an axis of any one of the suspensions and which is perpendicular to the disks.

2. A disk device according to claim 1, wherein the first contact portion of the first engagement member extends from a position apart from the center axis of the suspension, and the second engagement portion extends from a position apart from the center axis of the suspension.

3. A disk device according to claim 1, wherein the first and second contact portions are provided to be apart from each other by a predetermined distance in the direction of movement of the heads substantially in parallel to the surfaces of the first and second disks, and the first and second guides are displaced with respect to each other by the predetermined distance in the direction of movement of the heads substantially in parallel to the surfaces of the first and second disks.

4. A disk device according to claim 1, wherein the ramp has a base member coupling the plurality of guides with each other, and the base member has a plurality of projecting members facing outer circumferential portions of the first and second disks, and the plurality of projecting members are located closer to the outer circumferential portions of the first and second disks than the guides.

5. A disk device comprising:

a disk;

a head actuator having a head for reproducing data from the disk, and a suspension supporting the head to be movable with respect to the disk; and a Tamp loading mechanism for holding the head at a position distant from the disk when the head is moved to an outer circumference of the disk;

wherein the ramp loading mechanism includes a ramp having a guide provided near the outer circumference of the disk, and an engagement member provided at an end of the suspension, which is engaged with the guide of the ramp when the head is moved to the outer circumference of the disk, so as to pull away the head;

the guide of the ramp extends at a certain height with respect to the disk and extends such that the distance from the guide to a rotation center of the bead actuator varies; and the engagement member has a contact portion which is engageable with the guide, the contact portion obliquely extends from the suspension in a direction apart from the disk, as seen when projected onto a plane which contains an axis of the suspension and which is perpendicular to the disk.

6. A disk device comprising:

a disk;

a head actuator having a head for reproducing data from the disk, a suspension supporting the head to be movable with respect to the disk, and an engagement member disposed at the end of the suspension, the engagement member having a contact portion obliquely extending from the suspension in a direction away from the disk as projected onto a plane that includes an axis of the suspension and is perpendicular to the disk; and a ramp loading mechanism for holding the head at a position spaced apart from the disk in the event that the head is moved to an outer circumference of the disk, and including a ramp having a guide disposed near an outer circumference of the disk and extending at a certain height relative to the disk such that the distance from the guide to a rotation center of the bead actuator varies and engaging the contact portion to move the head away from the disk in the event that the head is moved to the outer circumference of the disk.

7. A disk device comprising:

a plurality of disks disposed at predetermined intervals;

a head actuator including a plurality of heads for reproducing data from the disks, including a plurality of suspensions supporting a respective one of the plurality of beads to be movable with respect to the disks about a rotation axis, and including engagement members disposed at an end of a respective suspension, two of the plurality of suspensions being located between first and second disks of the plurality of disks opposing each other, a first engagement member extending from an end of the suspension of said two suspensions located on the first disk side, a second engagement member extending from an end of the other one of said two suspensions located on the second disk side; and the first and second engagement members having first and second contact portions, respectively, the first contact portion obliquely extending from the suspension toward the second disk, the second contact portion obliquely extending from the suspension toward the first disk, as projected onto a plane that includes an axis of the associated suspension and is perpendicular to the disks; and a ramp loading mechanism for holding the heads at a position spaced apart from the respective magnetic disks in the event that the heads are moved to outer circumference of the disks, and including a ramp having a plurality of guides disposed near outer circumferences of the disks and arranged at intervals between each other in an axial direction of the disks and engaging a respective engagement member to move the respective head away from the disk in the event that the respective head is moved to the outer circumference of the respective disk, the first and second guides engage with first and second engagement members, respectively, the first guide being located closer to the second disk than the second guide, the second guide being located closer to the first disk than the first guide, the first guide extends at a certain height with respect to the surface of the second disk and extends such that the distance from the first guide to the rotation center of the head actuator varies, the second guide extends at a certain height with respect to the surface of the first disk and extends such that the distance from the first guide to a rotation center of the head actuator varies, the first and second guides being engageable with the first and second contact portions, respectively.

* * * * *